(12) United States Patent
Watanabe et al.

(10) Patent No.: US 11,288,628 B2
(45) Date of Patent: Mar. 29, 2022

(54) INFORMATION PRESENTATION SYSTEM, INFORMATION PRESENTATION APPARATUS, AND INFORMATION PRESENTATION METHOD

(71) Applicant: BRIDGESTONE CORPORATION, Chuo-ku Tokyo (JP)

(72) Inventors: Jun Watanabe, Kokubunji (JP); Shin Sukegawa, Tokyo (JP); Takayuki Ohara, Tokyo (JP); Kenji Matsuo, Kodaira (JP); Kotaro Yamada, Kodaira (JP); Satoshi Hirajima, Kodaira (JP); Suguru Yamaguchi, Kawasaki (JP)

(73) Assignee: BRIDGESTONE CORPORATION, Tokyo (JP)

( * ) Notice: Subject to any disclaimer, the term of this patent is extended or adjusted under 35 U.S.C. 154(b) by 52 days.

(21) Appl. No.: 16/767,114

(22) PCT Filed: Sep. 12, 2018

(86) PCT No.: PCT/JP2018/033882
§ 371 (c)(1),
(2) Date: May 27, 2020

(87) PCT Pub. No.: WO2019/111485
PCT Pub. Date: Jun. 13, 2019

(65) Prior Publication Data
US 2020/0372447 A1    Nov. 26, 2020

(30) Foreign Application Priority Data
Dec. 6, 2017 (JP) .............................. JP2017-234623

(51) Int. Cl.
*G06Q 10/08* (2012.01)
*G06Q 30/00* (2012.01)
*H04B 5/00* (2006.01)

(52) U.S. Cl.
CPC ....... *G06Q 10/087* (2013.01); *G06Q 30/0185* (2013.01); *H04B 5/0056* (2013.01)

(58) Field of Classification Search
CPC ............. G06Q 10/087; G06Q 30/0185; G06Q 30/0631; H04B 5/0056
(Continued)

(56) References Cited

U.S. PATENT DOCUMENTS

2003/0169149 A1   9/2003  Ohki et al.
2011/0273294 A1   11/2011  Harwell
(Continued)

FOREIGN PATENT DOCUMENTS

GB    2565147 A  *  2/2019  ............. G06Q 10/20
JP    H06286437 A    10/1994
(Continued)

OTHER PUBLICATIONS

Jun. 9, 2020, International Preliminary Report on Patentability issued in the International Patent Application No. PCT/JP2018/033882.
(Continued)

*Primary Examiner* — Russell S Glass
(74) *Attorney, Agent, or Firm* — Kenja IP Law PC

(57) ABSTRACT

An information presentation system includes an information presentation apparatus, a transmitter attached to a tire and configured to transmit tire ID information for identifying the tire, and a database configured to store tire ID information of tires which are genuine products, and the information presentation apparatus includes a reader configured to perform near field communication with the transmitter, to acquire the tire ID information transmitted by the transmitter, and a controller configured to cause an information presenter to present information indicating that the tire identified with the tire ID information is a genuine product
(Continued)

in a case where the tire ID information is stored in the database, and/or cause the information presenter to present information indicating that the tire identified with the tire ID information is a counterfeit product in a case where the tire ID information is not stored in the database.

16 Claims, 8 Drawing Sheets

(58) Field of Classification Search
USPC .......................................................... 705/28
See application file for complete search history.

(56) References Cited

U.S. PATENT DOCUMENTS

| | | | |
|---|---|---|---|
| 2013/0199704 A1 | 8/2013 | Damon | |
| 2014/0297545 A1* | 10/2014 | Prasad | G06Q 30/0185 705/318 |
| 2015/0108211 A1* | 4/2015 | Higgins | G06Q 10/0833 235/375 |
| 2018/0107914 A1* | 4/2018 | Ziola | G06K 19/10 |

FOREIGN PATENT DOCUMENTS

| | | |
|---|---|---|
| JP | H10320527 A | 12/1998 |
| JP | 2003263622 A | 9/2003 |
| JP | 2009163386 A | 7/2009 |
| JP | 2015505528 A | 2/2015 |
| JP | 2016218526 A | 12/2016 |
| JP | 2017120635 A | 7/2017 |
| JP | 2017132292 A | 8/2017 |
| WO | 2016157835 A1 | 10/2016 |
| WO | WO-2016157835 A1 * 10/2016 ............. G06Q 30/02 |  |

OTHER PUBLICATIONS

Jun. 28, 2021, search result of the Extended European Search Report issued by the European Patent Office in the corresponding European Patent Application No. 18886669.3.

Eugene Filimon, Anti-counterfeiting—prevention of counterfeit products with RFID, Business Aspects of the Internet of Things, May 1, 2008, XP055815238.

Dec. 11, 2018, International Search Report issued in the International Patent Application No. PCT/JP2018/033882.

* cited by examiner

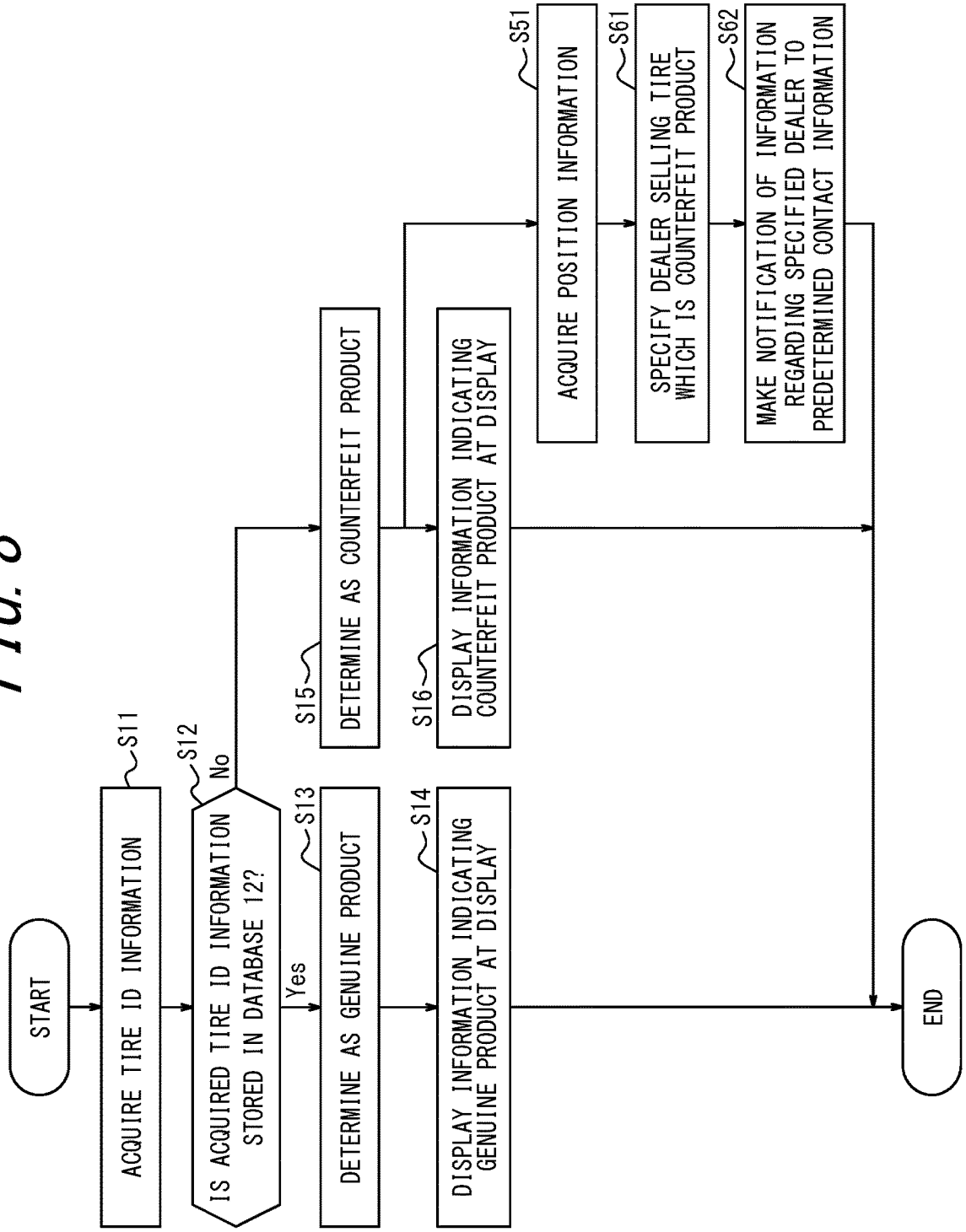

INFORMATION PRESENTATION SYSTEM, INFORMATION PRESENTATION APPARATUS, AND INFORMATION PRESENTATION METHOD

TECHNICAL FIELD

The present disclosure relates to an information presentation system, an information presentation apparatus, and an information presentation method.

BACKGROUND

Among tires to be mounted on a vehicle, there are tires to which RFID (Radio-Frequency Identification) tags for performing near field communication are attached (see, for example, PTL 1).

CITATION LIST

Patent Literature

PTL 1: Japanese Patent Laid-Open No. 2017-132292

SUMMARY

Technical Problem

By the way, in recent years, distribution of tires (counterfeit products) which are manufactured by manufactures other than official manufacturers by imitating tires (genuine products) manufactured by official manufacturers, is problematic. Therefore, for example, a technique of presenting information indicating whether a tire to be provided to a user is a genuine product or a counterfeit product at a dealer, or the like, which sells tires, so as to prevent the user from misidentifying a counterfeit product as a genuine product and purchasing the counterfeit product, is desired.

An object of the present disclosure which has been made in view of the problem as described above is to provide an information presentation system, an information presentation apparatus and an information presentation method which are capable of presenting information indicating whether a tire to be provided to a user is a genuine product or a counterfeit product.

Solution to Problem

An information presentation system as one aspect of the present disclosure is an information presentation system which presents information indicating whether a tire to be provided to a user is a genuine product or a counterfeit product, the information presentation system including an information presentation apparatus possessed by the user and configured to present information to the user, a transmitter attached to the tire to be provided to the user and configured to transmit tire ID information for identifying the tire, and a first database configured to store tire ID information of tires which are genuine products. The information presentation apparatus includes an information presenter configured to present information to the user, a reader configured to perform near field communication with the transmitter attached to the tire, to acquire the tire ID information transmitted by the transmitter, and a controller configured to determine whether or not the tire ID information acquired by the reader is stored in the first database, and, in a case where the tire ID information is stored in the first database, determine that the tire identified with the tire ID information is a genuine product, and cause the information presenter to present information indicating that the tire is a genuine product, and/or, in a case where the tire ID information is not stored in the first database, determine that the tire identified with the tire ID information is a counterfeit product, and cause the information presenter to present information indicating that the tire is a counterfeit product.

An information presentation apparatus as one aspect of the present disclosure is an information presentation apparatus which presents information indicating whether a tire to be provided to a user is a genuine product or a counterfeit product, to the user, the information presentation apparatus including an information presenter configured to present information to the user, a reader configured to perform near field communication with a transmitter which is attached to the tire to be provided to the user and which transmits tire ID information for identifying the tire, to acquire the tire ID information transmitted by the transmitter; and a controller configured to determine whether or not the tire ID information acquired by the reader is stored in a database which stores tire ID information of tires which are genuine products, and cause the information presenter to present information indicating that the tire identified with the tire ID information is a genuine product in a case where the tire ID information is stored in the database, and information indicating that the tire identified with the tire ID information is a counterfeit product in a case where the tire ID information is not stored in the database.

An information presentation method as one aspect of the present disclosure is an information presentation method for presenting information indicating whether a tire to be provided to a user is a genuine product or a counterfeit product, to the user, the information presentation method including a step of performing near field communication with a transmitter which is attached to the tire to be provided to the user and which transmits tire ID information for identifying the tire, to acquire the tire ID information transmitted by the transmitter, and a step of determining whether or not the acquired tire ID information is stored in a database which stores tire ID information of tires which are genuine products, and presenting to the user, information indicating that the tire identified with the tire ID information is a genuine product in a case where the tire ID information is stored in the database, and information indicating that the tire identified with the tire ID information is a counterfeit product in a case where the tire ID information is not stored in the database.

Advantageous Effect

According to the present disclosure, it is possible to provide an information presentation system, an information presentation apparatus, and an information presentation method which are capable of presenting information indicating whether a tire to be provided to a user is a genuine product or a counterfeit product.

BRIEF DESCRIPTION OF THE DRAWINGS

In the accompanying drawings:

FIG. 8 is a flowchart illustrating still further example of the operation of the information presentation apparatus illustrated in FIG. 1.

DETAILED DESCRIPTION

Figure 1:
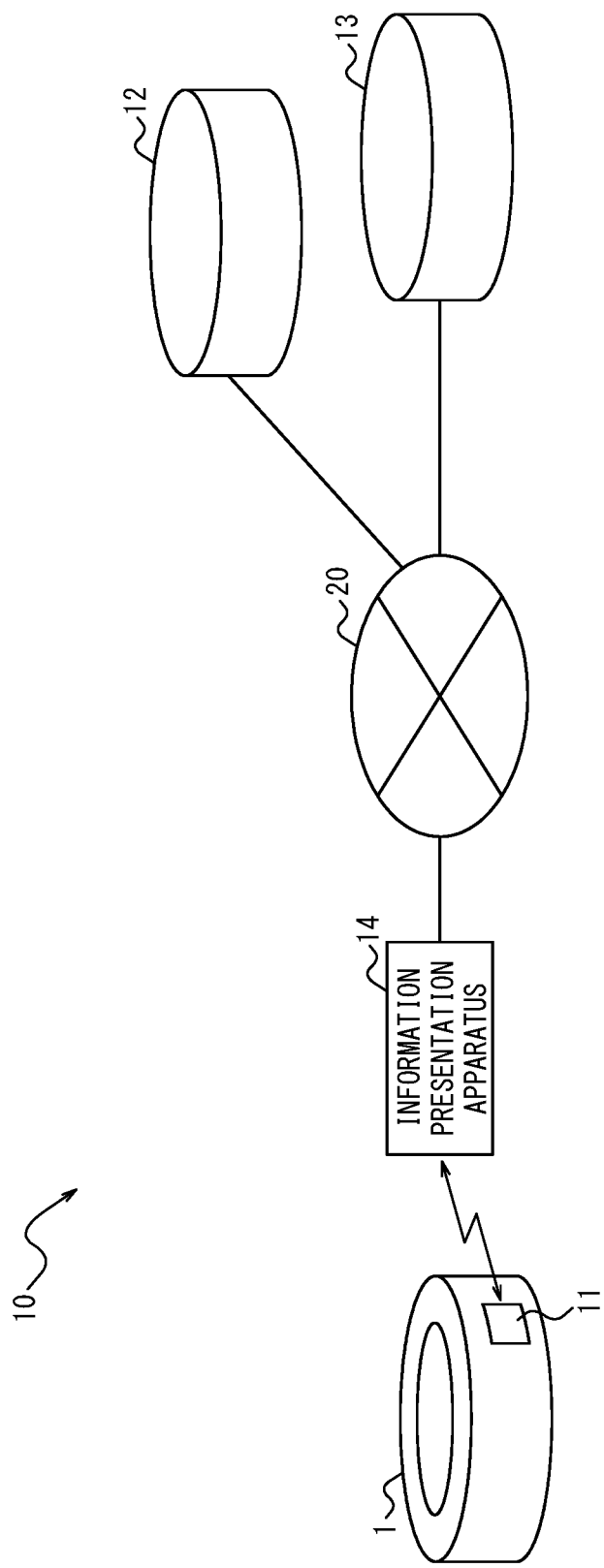
FIG. 1 is a view illustrating a configuration example of an information presentation system according to an embodiment of the present disclosure.

An embodiment of the present disclosure will be described by way of example below with reference to the drawings. Note that, in the drawings, the same reference numerals indicate the same or equivalent components.

FIG. 1 is a view illustrating a configuration example of an information presentation system 10 according to an embodiment of the present disclosure. The information presentation system 10 according to the present embodiment presents to a user, information indicating whether a tire 1 to be provided to the user is a tire (genuine product) manufactured by an official manufacturer or a tire (counterfeit product) which is manufactured by a manufacturer other than an official manufacturer by imitating a genuine product, at a dealer, or the like, of the tire 1.

The information presentation system 10 illustrated in FIG. 1 includes a transmitter 11, databases 12 and 13, and an information presentation apparatus 14. The databases 12 and 13 can perform communication with the information presentation apparatus 14 via a network 20.

The transmitter 11 is attached to the tire 1 which is displayed at a tire dealer, and which is to be provided to the user. The transmitter 11 is, for example, incorporated into the tire 1 (embedded in the tire 1 or pasted on an inner surface of the tire 1). Further, the transmitter 11 may be pasted on a surface of the tire 1 if a position where the transmitter 11 is pasted is a position where the transmitter 11 is difficult to be removed from the tire 1, and a position where the transmitter 11 is not affected by contact between the tire 1 and a road surface. The transmitter 11 transmits a predetermined signal, for example, identification information for identifying the tire 1 (hereinafter, referred to as tire ID information) to which the transmitter 11 is attached. Specific examples of the transmitter 11 can include an RFID tag. The RFID tag performs near field (approximately several centimeters to several meters) communication with a reader apparatus using an electromagnetic field, a radio wave, or the like, to exchange information. Note that, as described above, in recent years, it is studied to attach an RFID tag to a tire. In the following description, it is assumed that the transmitter 11 such as an RFID tag is attached to at least a tire which is a genuine product.

The database 12 (first database) stores tire ID information of tires which are genuine products manufactured by official manufacturers. The database 12 is, for example, managed by an official manufacturer, and tire ID information of the tire 1 is stored upon manufacturing, shipment, or the like, of the tire 1 at the official manufacturer.

The database 13 (second database) stores identification information for identifying a user who uses the information presentation apparatus 14 (hereinafter, referred to as user ID information), and identification information for identifying a vehicle (vehicle type) owned by the user (hereinafter, referred to as vehicle ID information) in association with each other. In the database 13, for example, when a user purchases a vehicle, user ID information of the user, and vehicle ID information of the vehicle purchased by the user are stored.

The information presentation apparatus 14 is, for example, used by a user, or the like, who considers purchasing of the tire 1 which is displayed at a tire dealer, or the like. The information presentation apparatus 14 is a communication terminal such as, for example, a mobile phone, a smartphone and a tablet terminal owned by the user. These communication terminals can operate as the information presentation apparatus 14 according to the present embodiment by a predetermined program (application) being downloaded to these communication terminals. The information presentation apparatus 14 may be a dedicated apparatus provided at a tire dealer, or the like.

The information presentation apparatus 14 performs near field communication with the transmitter 11 attached to the tire 1 to be provided to the user, to acquire tire ID information transmitted by the transmitter 11. In a case where the acquired tire ID information is stored in the database 12, the information presentation apparatus 14 determines that the tire 1 identified with the tire ID information is a genuine product. Then, the information presentation apparatus 14 presents to the user, information indicating that the tire 1 identified with the tire ID information is a genuine product. Further, in a case where the acquired tire ID information is not stored in the database 12, the information presentation apparatus 14 determines that the tire 1 identified with the tire ID information is a counterfeit product. Then, the information presentation apparatus 14 presents to the user, information indicating that the tire 1 identified with the tire ID information is a counterfeit product. Note that the information presentation apparatus 14 may present to the user, at least one of the information indicating that the tire 1 identified with the tire ID information is a genuine product and the information indicating that the tire 1 identified with the tire ID information is a counterfeit product. The information presentation apparatus 14 presents to the user, information indicating that the tire 1 is a counterfeit product also in a case where the tire ID information cannot be acquired from the tire 1.

As described above, in the database 12, tire ID information of tires which are genuine products is stored. Therefore, in a case where the tire ID information of the tire 1 is stored in the database 12, it can be determined that the tire 1 is a genuine product. Further, in a case where the tire ID information of the tire 1 is not stored in the database 12, it can be determined that the tire 1 is a counterfeit product. Further, as described above, the transmitter 11 is attached to a tire which is a genuine product. Therefore, in a case where the transmitter 11 is not attached to the tire 1, and the tire ID information cannot be acquired, it can be determined that the tire 1 is a counterfeit product.

A configuration of the information presentation apparatus 14 according to the present embodiment will be described next.

Figure 2:
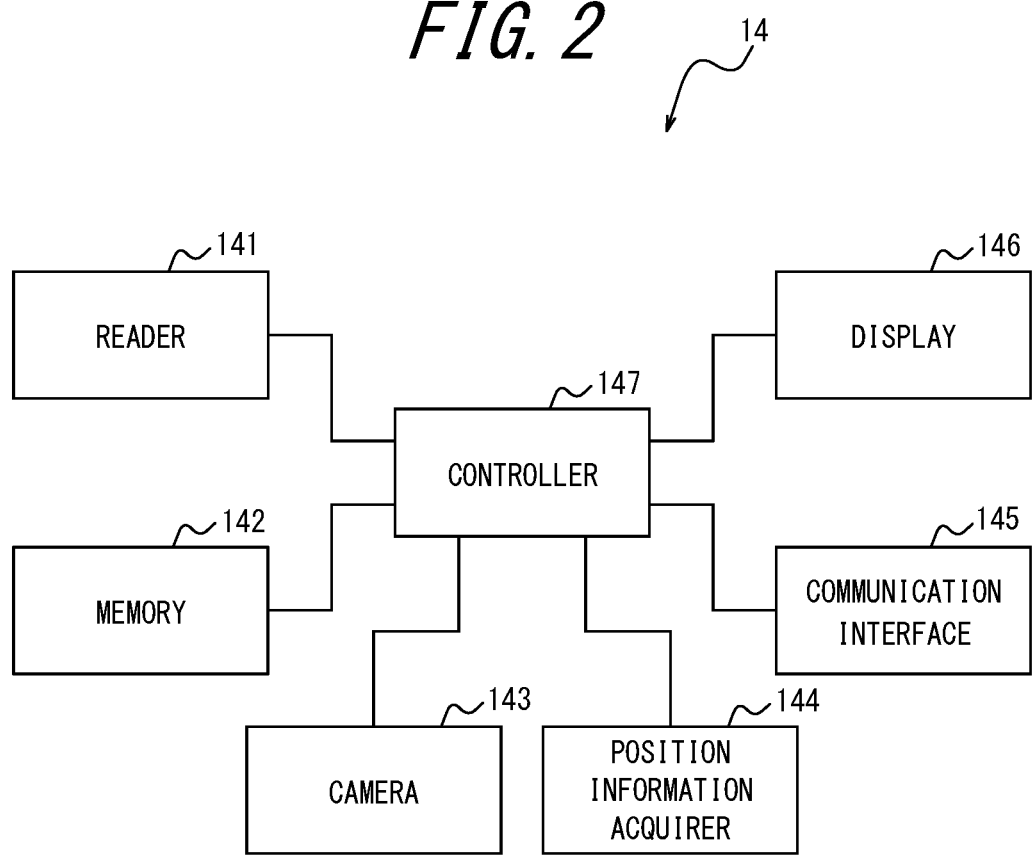
FIG. 2 is a view illustrating a configuration example of an information presentation apparatus illustrated in FIG. 1.

FIG. 2 is a view illustrating a configuration example of the information presentation apparatus 14 according to the present embodiment.

The information presentation apparatus 14 illustrated in FIG. 2 includes a reader 141, a memory 142, a camera 143, a position information acquirer 144, a communication interface 145, a display 146, and a controller 147.

The reader 141 performs near field (approximately several centimeters to several meters) communication with the transmitter 11 attached to the tire 1 in accordance with control by the controller 147, to acquire tire ID information transmitted by the transmitter 11. The reader 141 outputs the acquired tire ID information to the controller 147.

The memory 142 stores various kinds of programs, information, or the like. For example, the memory 142 stores programs for realizing various kinds of functions provided at the information presentation apparatus 14. Further, the memory 142 stores user ID information of the user of the information presentation apparatus 14.

The camera 143 performs imaging in accordance with control by the controller 147 and outputs the captured image to the controller 147.

The position information acquirer 144 acquires position information of the information presentation apparatus 14 in accordance with control by the controller 147. The position information acquirer 144 acquires the position information, for example, on the basis of a GPS (Global Positioning System) signal. The position information acquirer 144 outputs the acquired position information to the controller 147.

The communication interface 145 performs communication with the databases 12, 13, or the like, via the network 20 in accordance with control by the controller 147.

The display 146 displays various kinds of information in accordance with control by the controller 147. The display 146 is an example of an information presenter which presents information to the user. In a case where the information presentation apparatus 14 includes a sound output interface which outputs sound, the sound output interface may be used as the information presenter.

The controller 147 controls overall operation of the information presentation apparatus 14. For example, if operation for reading the tire ID information of the tire 1 is performed, the controller 147 causes the reader 141 to perform near field communication with the transmitter 11. Then, if the reader 141 acquires the tire ID information from the transmitter 11 of the tire 1, the controller 147 determines whether or not the tire ID information acquired by the reader 141 is stored in the database 12 by referring to the database 12 via the communication interface 145. In a case where the tire ID information acquired by the reader 141 is stored in the database 12, the controller 147 determines that the tire 1 identified with the tire ID information is a genuine product, and causes information indicating that the tire 1 is a genuine product to be displayed at the display 146. Further, in a case where the tire ID information acquired by the reader 141 is not stored in the database 12, the controller 147 determines that the tire 1 identified with the tire ID information is a counterfeit product, and causes information indicating that the tire 1 is a counterfeit product to be displayed at the display 146. Note that the controller 147 may present to the user at least one of the information indicating that the tire 1 identified with the tire ID information is a genuine product and the information indicating that the tire 1 identified with the tire ID information is a counterfeit product.

Operation of the information presentation apparatus 14 according to the present embodiment will be described next.

Figure 3:
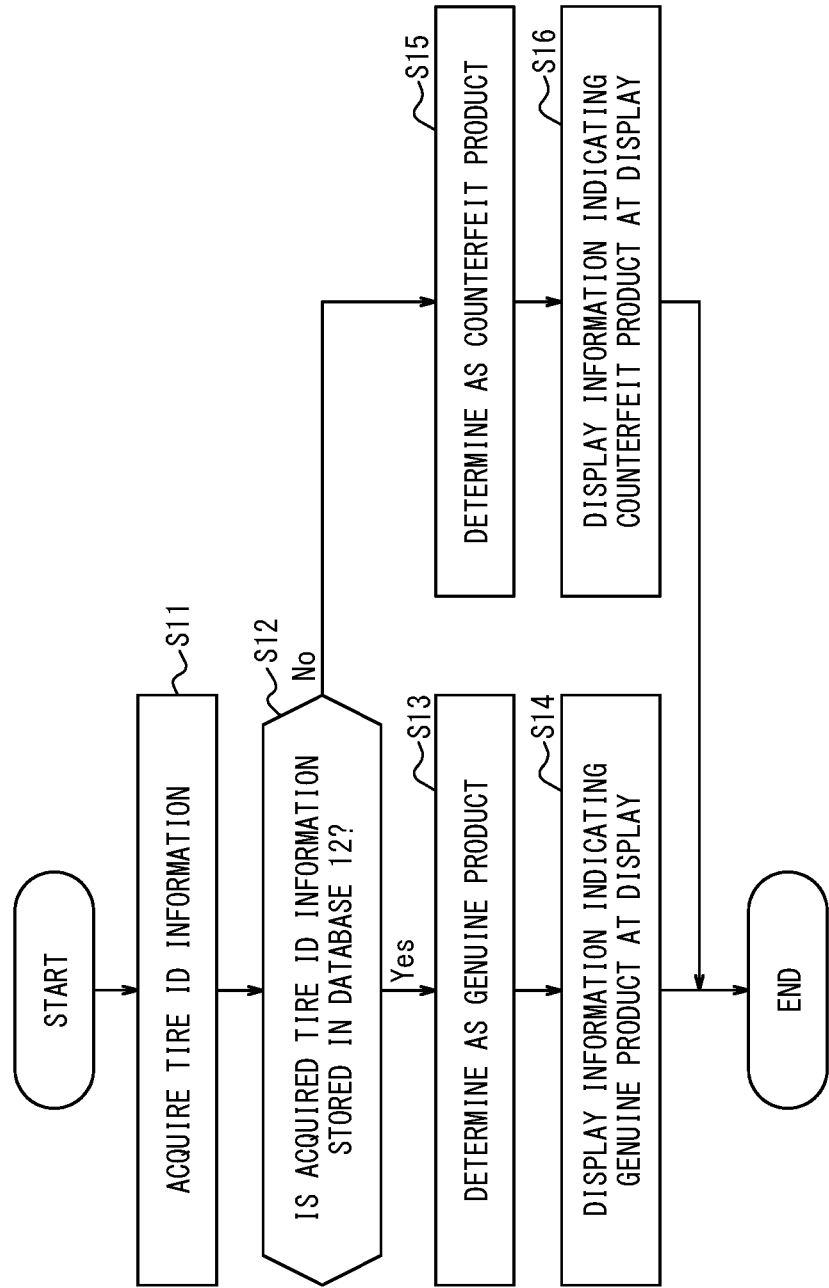
FIG. 3 is a flowchart illustrating an example of operation of the information presentation apparatus illustrated in FIG. 1.

FIG. 3 is a flowchart illustrating an example of the operation of the information presentation apparatus 14.

For example, if operation for reading the tire ID information of the tire 1 is performed, the controller 147 causes the reader 141 to perform near field communication with the transmitter 11, to acquire the tire ID information of the tire 1 via the reader 141 (step S11).

Then, the controller 147 determines whether or not the acquired tire ID information is stored in the database 12 with reference to the database 12 via the communication interface 145 (step S12).

In a case where it is determined that the acquired tire ID information is stored in the database 12 (step S12: Yes), the controller 147 determines that the tire 1 identified with the tire ID information is a genuine product (step S13). Then, the controller 147 causes information indicating that the tire 1 identified with the acquired tire ID information is a genuine product to be displayed at the display 146 (step S14).

In a case where it is determined that the acquired tire ID information is not stored in the database 12 (step S12: No), the controller 147 determines that the tire 1 identified with the tire ID information is a counterfeit product (step S15). Then, the controller 147 causes information indicating that the tire 1 identified with the acquired tire ID information is a counterfeit product to be displayed at the display 146 (step S16).

In this manner, by determining whether or not the tire ID information acquired from the tire 1 is stored in the database 12 which stores tire ID information of tires which are genuine products, it is possible to determine whether the tire 1 is a genuine product or a counterfeit product, and present information indicating a determination result to the user. Further, for example, with an RFID, by bringing the transmitter and the reader apparatus close to each other, it is possible to exchange information. Therefore, in a case where an RFID tag is used as the transmitter 11, it is possible to present to the user, information indicating whether the tire 1 is a genuine product or a counterfeit product with simple operation of bringing the tire 1 and the reader 141 of the information presentation apparatus 14 close to each other.

Figure 4:
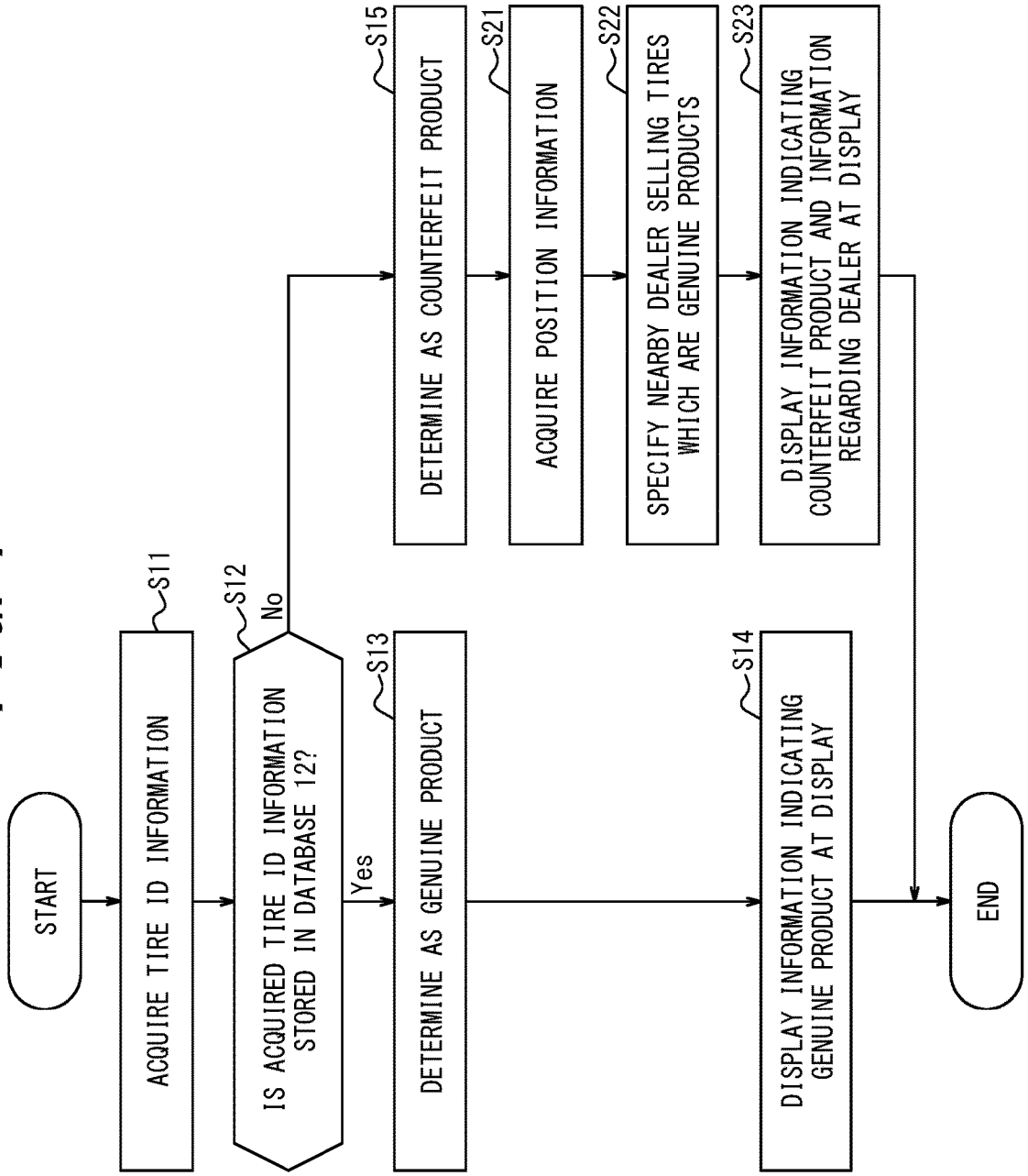
FIG. 4 is a flowchart illustrating another example of the operation of the information presentation apparatus illustrated in FIG. 1.

In a case where it is determined that the tire 1 identified with the acquired tire ID information is a counterfeit product, the information presentation apparatus 14 may present to the user, various kinds of information along with information indicating the determination result. For example, the information presentation apparatus 14 may present to the user, information regarding a dealer selling tires which are genuine products along with the information indicating that the tire 1 is a counterfeit product. Operation in a case where the information regarding a dealer selling tires which are genuine products is presented will be described below with reference to FIG. 4. Note that, in FIG. 4, the same reference numerals will be assigned to processing similar to that in FIG. 3, and description will be omitted.

If it is determined that the tire 1 identified with the acquired tire ID information is a counterfeit product (step S15), the controller 147 instructs the position information acquirer 144 to acquire position information. Then, the controller 147 acquires the position information acquired by the position information acquirer 144 in accordance with the instruction (step S21).

Then, the controller 147 specifies a dealer selling tires which are genuine products (for example, a retail store directly managed by an official manufacturer) near the information presentation apparatus 14 on the basis of the acquired position information (step S22).

Then, the controller 147 causes information indicating that the tire 1 identified with the acquired tire ID information is a counterfeit product and information (such as position information and contact information) regarding the dealer specified as a dealer which sells genuine products to be displayed at the display 146 (step S23). Note that the information regarding dealers selling tires which are genuine products is stored in advance in the databases 12 and 13 or other databases connected to the network 20. The controller 147 can specify a dealer near the information presentation apparatus 14 with reference to the database which stores information regarding dealers which sell tires which are genuine products, and can present the information regarding the dealer to the user.

In this manner, in a case where it is determined that the tire 1 identified with the acquired tire ID information is a counterfeit product, by the information regarding the nearby dealer selling tires which are genuine products being presented, the user can easily understand where he/she can acquire tires which are genuine products.

Figure 5:
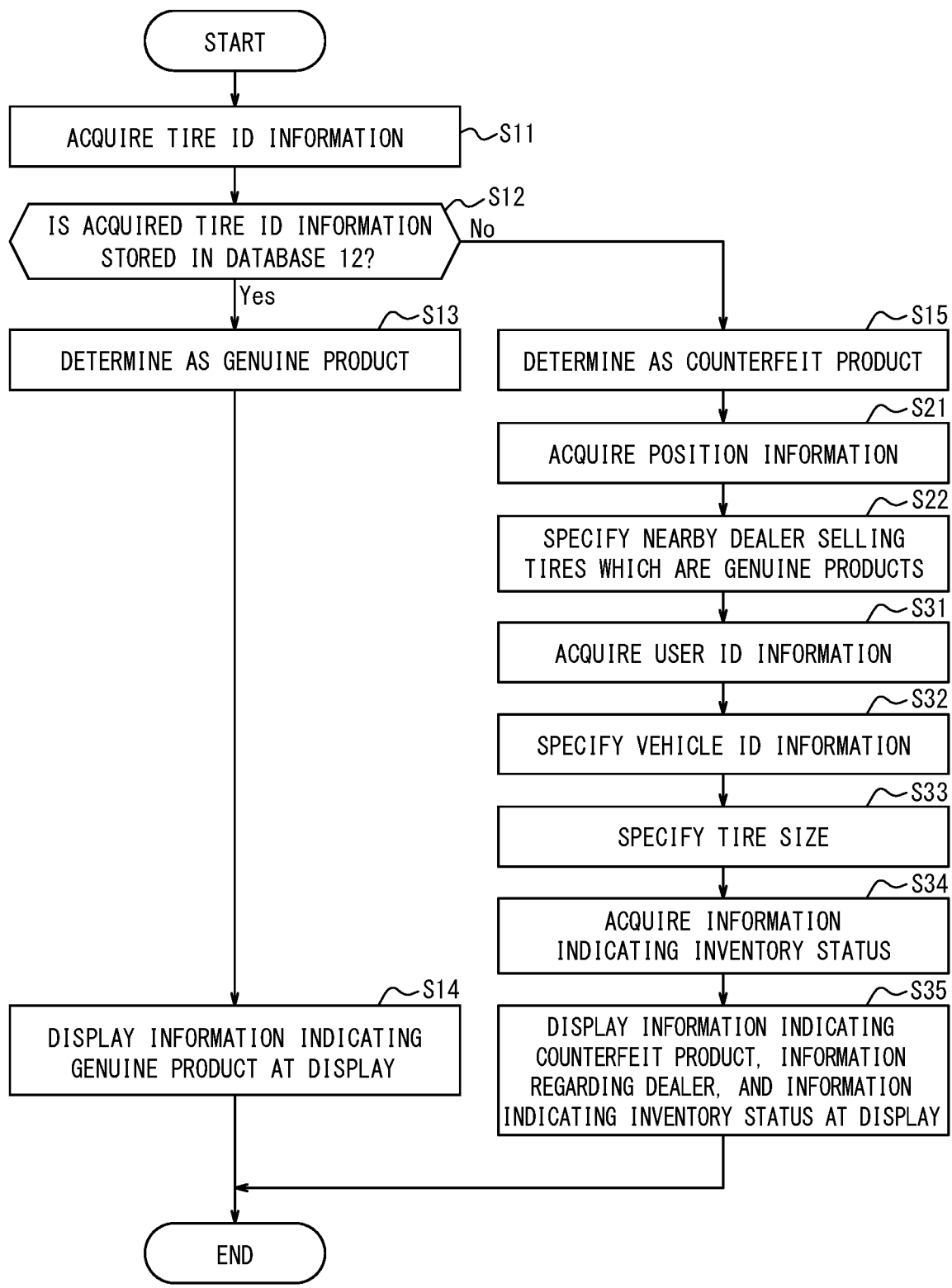
FIG. 5 is a flowchart illustrating still another example of the operation of the information presentation apparatus illustrated in FIG. 1.

Further, the information presentation apparatus 14 may present to the user, information regarding an inventory status of tires at the dealer in addition to the information regarding the dealer selling tires which are genuine products, near the information presentation apparatus 14. Operation in a case where the information indicating an inventory status at the dealer selling tires which are genuine products is presented will be described below with reference to FIG. 5. Note that, in FIG. 5, the same reference numerals will be assigned to processing similar to that in FIG. 3 and FIG. 4, and description will be omitted.

If the dealer selling tires which are genuine products, near the information presentation apparatus 14 is specified (step S22), the controller 147 acquires the user ID information stored in the memory 142 (step S31). Then, the controller 147 acquires the vehicle ID information stored in association with the acquired user ID information with reference to the database 13 via the communication interface 145 (step S32).

Then, the controller 147 specifies a tire size of a tire to be mounted on the vehicle identified with the acquired vehicle ID information (step S33). Then, the controller 147 acquires information indicating an inventory status of tires of the specified tire size at the dealer selling tires which are genuine products, near the information presentation apparatus 14 (step S34). Note that the information indicating an inventory status at the dealer is only required to be regularly registered by each dealer in, for example, the database which stores information regarding dealers.

Then, the controller 147 causes the information indicating that the tire 1 identified with the acquired tire ID information is a counterfeit product, the information regarding the dealer selling tires which are genuine products, near the information presentation apparatus 14, and the information indicating an inventory status of the dealer which sells tires of the specified tire size to be displayed at the display 146 (step S35).

In this manner, by the tire size of a tire to be mounted on the vehicle of the user identified with the user ID information being specified, and information indicating an inventory status of tires of the tire size at the dealer which sells genuine products near the information presentation apparatus 14 being presented, the user can visit the dealer after confirming the inventory status of tires which are genuine products and which can be mounted on the vehicle owned by the user.

Figure 6:
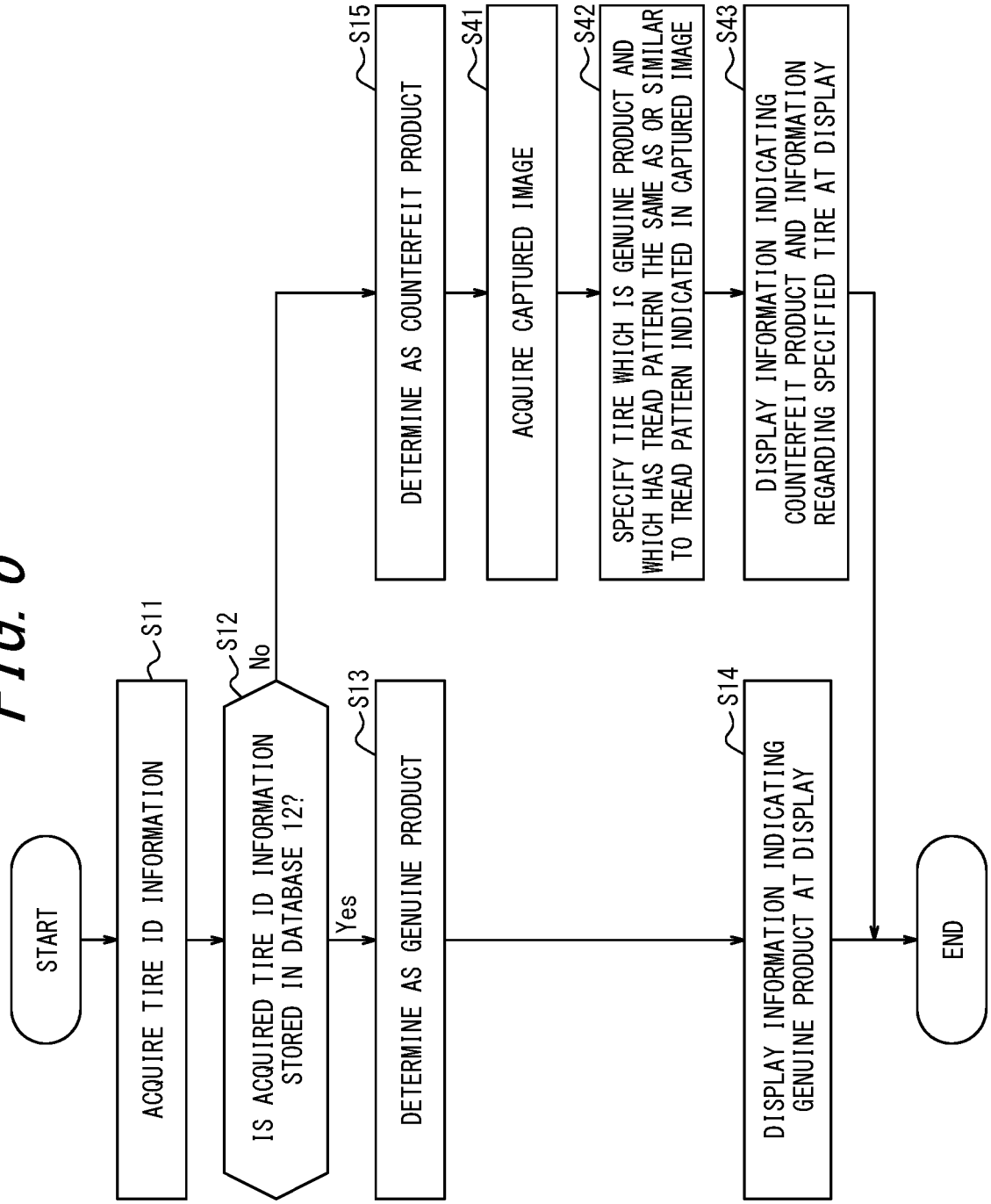
FIG. 6 is a flowchart illustrating yet another example of the operation of the information presentation apparatus illustrated in FIG. 1.

Further, in a case where it is determined that the tire 1 for which the tire ID information has been acquired is a counterfeit product, the information presentation apparatus 14 may present to the user, information regarding a tire which is a genuine product, and which has a tread pattern the same as or similar to that of the tire 1, along with the information indicating the determination result. Operation in a case where information regarding a tire having a tread pattern the same as or similar to that of the tire 1 determined as a counterfeit product is presented to the user will be described below with reference to FIG. 6. Note that, in FIG. 6, the same reference numerals will be assigned to processing similar to that in FIG. 3, and description will be omitted.

If it is determined that the tire 1 identified with the acquired tire ID information is a counterfeit product (step S15), the controller 147, for example, causes a message, or the like, for encouraging the user to capture an image of the tread pattern of the tire 1 for which the tire ID information has been acquired with the camera 143, to be displayed at the display 146. Then, if an image of the tread pattern of the tire 1 for which the tire ID information has been acquired is captured in response to the message, the controller 147 acquires the image captured with the camera 143 (step S41).

Then, the controller 147 specifies a tire which is a genuine product and which has a tread pattern the same as or similar to the tread pattern indicated in the acquired captured image (step S42), and acquires information regarding the specified tire (such as performance information such as maneuverability, heat dissipation and drainage performance, product number information, and price information). Note that the tread pattern of the tire which is a genuine product and the information regarding the tire are, for example, registered in the database 12 or other databases connected to the network 20 by an official manufacturer which has manufactured the tire.

Then, the controller 147 causes the information indicating that the tire 1 identified with the acquired tire ID information is a counterfeit product and information regarding the tire specified as the tire having a tread pattern which is the same as or similar to that of the tire 1 to be displayed at the display 146 (step S43).

In this manner, in a case where it is determined that the tire 1 identified with the acquired tire ID information is a counterfeit product, by information regarding a tire which is a genuine product and which has a tread pattern the same as or similar to that of the tire 1 being presented, the user can easily understand the tire which is a genuine product and which has performance, or the like, equivalent to the tire 1 determined as a counterfeit product.

Further, the controller 147 may further cause information indicating an inventory status of tires which are genuine products and which are specified as the tire having a tread pattern the same as or similar to that of the tire 1 determined as a counterfeit product, at the dealer near the information presentation apparatus 14 to be displayed at the display 146. By this means, the user can visit the dealer after confirming the inventory status of the tires which are genuine products and which have a tread pattern the same as or similar to that of the tire 1 determined as a counterfeit product.

Figure 7:
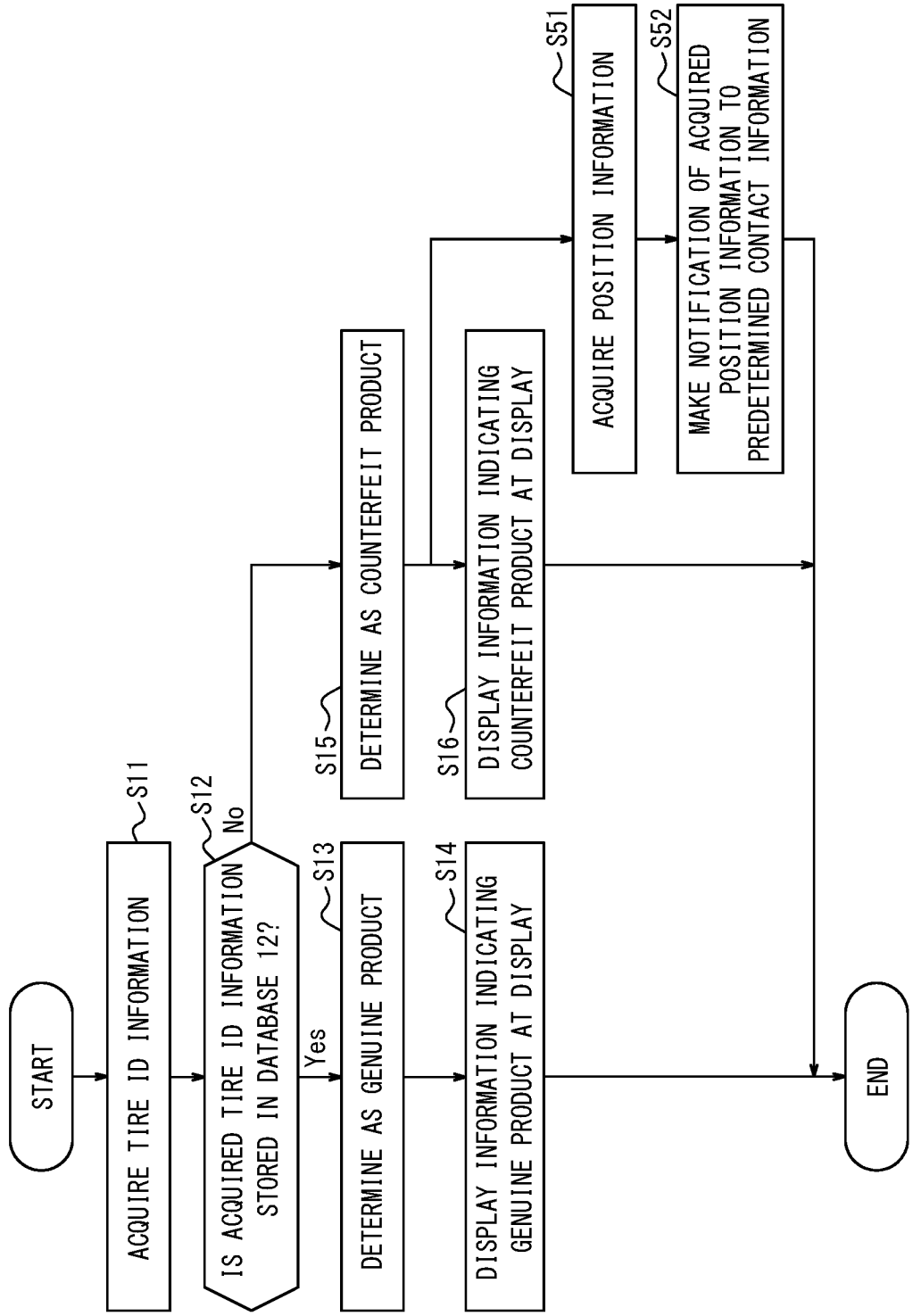
FIG. 7 is a flowchart illustrating further example of the operation of the information presentation apparatus illustrated in FIG. 1.

Further, in a case where it is determined that the tire 1 identified with the acquired tire ID information is a counterfeit product, the controller 147 may make a notification of the position information of the information presentation apparatus 14 to predetermined contact information. Operation in a case where a notification of the position information of the information presentation apparatus 14 is made to the predetermined contact information in a case where it is determined that the tire 1 for which the tire ID information has been acquired is a counterfeit product will be described below with reference to FIG. 7. Note that, in FIG. 7, the same reference numerals will be assigned to processing similar to that in FIG. 3, and description will be omitted.

If it is determined that the tire 1 identified with the acquired tire ID information is a counterfeit product (step S15), the controller 147 instructs the position information acquirer 144 to acquire the position information. Then, the controller 147 acquires the position information acquired by the position information acquirer 144 in accordance with the instruction (step S51).

Then, the controller 147 makes a notification of the acquired position information to predetermined contact information, for example, an official manufacturer which manufactures tires which are genuine products (step S52).

As described above, the transmitter 11 attached to the tire 1 and the reader 141 of the information presentation apparatus 14 perform near filed communication in which a communication distance is approximately several centimeters to several meters. That is, in a case where the tire ID information is acquired from the transmitter 11 attached to the tire 1 via the reader 141, a distance between the tire 1 and the information presentation apparatus 14 is a short distance of approximately several centimeters to several meters. Therefore, it can be estimated that the position of the tire 1 for which the tire ID information has been acquired is substantially the same as the position of the information presentation apparatus 14. Therefore, in a case where it is determined that the tire 1 for which the tire ID information has been acquired is a counterfeit product, by making a notification of the position of the information presentation apparatus 14 to the predetermined contact information (for example, an official manufacturer), it is possible to make a notification of the position of the tire 1 which is a counterfeit product to the predetermined contact information.

Further, in a case where it is determined that the tire 1 identified with the acquired tire ID information is a counterfeit product, the controller 147 may make a notification of information regarding the dealer which sells the tire 1 to the predetermined contact information. Operation in a case where a notification of the information regarding the dealer which sells the tire 1 is made to the predetermined contact information in a case where it is determined that the tire 1 for which the tire ID information has been acquired is a counterfeit product will be described below with reference to FIG. 8. Note that, in FIG. 8, the same reference numerals will be assigned to processing similar to that in FIG. 3 and FIG. 7, and description will be omitted.

If the controller 147 determines that the tire 1 identified with the acquired tire ID information is a counterfeit product (step S15) and acquires the position information of the information presentation apparatus 14 (step S51), the controller 147 specifies the dealer which sells the tire 1 on the basis of the acquired position information (step S61). As described above, the position of the tire 1 for which the tire ID information has been acquired is substantially the same as the position of the information presentation apparatus 14. Further, normally, in a case where the information presentation apparatus 14 acquires the tire ID information of the tire 1 in the dealer, the position of the information presentation apparatus 14 is included in property of the dealer. Therefore, in a case where it is determined that the tire 1 for which the tire ID information has been acquired is a counterfeit product, it can be estimated that the position information of the information presentation apparatus 14 indicates a position of the dealer selling the tire 1 which is a counterfeit product. The controller 147 can specify the dealer which sells the tire 1 determined as a counterfeit product by checking the acquired position information of the information presentation apparatus 14 against position information of respective tire dealers. Note that the position information of the dealers is stored in advance in, for example, the databases 12, 13 or other databases connected to the network 20.

The controller 147 makes a notification of the information regarding the specified dealer (such as position information and store name information) to predetermined contact information, for example, an official manufacturer manufacturing tires which are genuine products (step S62).

In this manner, in a case where it is determined that the tire 1 for which the tire ID information has been acquired is a counterfeit product, by a notification of the information regarding the dealer which sells the tire 1 being made to the predetermined contact information (for example, the official manufacturer), it is possible to make a notification of the information regarding the dealer which sells a counterfeit product to the predetermined contact information.

Note that the controller 147 may perform respective kinds of operation described with reference to FIG. 4 to FIG. 8 in combination as appropriate.

In this manner, the information presentation system 10 according to the present embodiment includes the information presentation apparatus 14 which is possessed by the user and which presents information to the user, the transmitter 11 which is attached to the tire 1 to be provided to the user and which transmits tire ID information for identifying the tire, and the database 12 (first database) which stores tire ID information of tires which are genuine products. The information presentation apparatus 14 includes the display 146 (information presenter) which presents information to the user, the reader 141 which performs near field communication with the transmitter 11 attached to the tire 1, to acquire the tire ID information transmitted by the transmitter 11, and the controller 147 which determines whether or not the tire ID information acquired by the reader 141 is stored in the database 12, and causes the display 146 to present information indicating that the tire 1 identified with the tire ID information is a genuine product in a case where the tire ID information is stored in the database 12, and information indicating that the tire 1 identified with the tire ID information is a counterfeit product in a case where the tire ID information is not stored in the database 12.

Further, the information presentation apparatus 14 according to the present embodiment includes the display 146 (information presenter) which presents information to the user, the reader 141 which performs near field communication with the transmitter 11 which is attached to the tire 1 to be provided to the user and which transmits tire ID information for identifying the tire 1, to acquire the tire ID information transmitted by the transmitter 11, and the controller 147 which determines whether or not the tire ID information acquired by the reader 141 is stored in the database 12 (first database) which stores tire ID information of tires which are genuine products, and causes the display 146 to present information indicating that the tire 1 identified with the tire ID information is a genuine product in a case where the tire ID information is stored in the database 12, and information indicating that the tire 1 identified with the tire ID information is a counterfeit product in a case where the tire ID information is not stored in the database 12.

Further, the information presentation method according to the present embodiment includes a step of performing near field communication with the transmitter 11 which is attached to the tire 1 to be provided to the user and which transmits tire ID information for identifying the tire 1, to acquire the tire ID information transmitted by the transmitter 11, and a step of determining whether or not the acquired tire ID information is stored in the database 12 (first database) which stores tire ID information of tires which are genuine products, and presenting to the user, information indicating that the tire 1 identified with the tire ID information is a genuine product in a case where the tire ID information is stored in the database 12, and information indicating that the tire 1 identified with the tire ID information is a counterfeit product in a case where the tire ID information is not stored in the database 12.

In a case where the tire ID information of the tire 1 is stored in the database 12 which stores tire ID information of tires which are genuine products, it can be determined that the tire 1 is a genuine product, and, in a case where the tire ID information of the tire 1 is not stored, it can be determined that the tire 1 is a counterfeit product. Therefore, by acquiring the tire ID information transmitted by the transmitter 11 attached to the tire 1 and determining whether or not the tire ID information is stored in the database 12, it is possible to present to the user, information indicating whether the tire 1 is a genuine product or a counterfeit product.

The information presentation system, the information presentation apparatus, and the information presentation method according to the present disclosure are not limited to specific configurations described in the above-described embodiment, and various modifications and change can be made without deviating from the scope of the claims.

REFERENCE SIGNS LIST

1 tire
10 information presentation system
11 transmitter
12 database (first database)
13 database (second database)
14 information presentation apparatus
20 network
141 reader
142 memory
143 camera
144 position information acquirer
145 communication interface
146 display (information presenter)
147 controller

The invention claimed is:

1. An information presentation system which presents information indicating whether a tire to be provided to a user is a genuine product or a counterfeit product, the information presentation system comprising:
   an information presentation apparatus possessed by the user and configured to present information to the user;
   a transmitter attached to the tire to be provided to the user and configured to transmit tire ID information for identifying the tire; and
   a first database configured to store tire ID information of tires which are genuine products,
   wherein the information presentation apparatus comprises:
      an information presenter configured to present information to the user;
      a reader configured to perform near field communication with the transmitter attached to the tire, to acquire the tire ID information transmitted by the transmitter; and
      a controller configured to determine whether or not the tire ID information acquired by the reader is stored in the first database, and, in a case where the tire ID information is stored in the first database, determine that tire identified with the tire ID information is a genuine product, and cause the information presenter to present information indicating that the tire is a genuine product, and/or, in a case where the tire ID information is not stored in the first database, determine that the tire identified with the tire ID information is a counterfeit product, and cause the information presenter to present information indicating that the tire is a counterfeit product, and
   wherein, in a case where it is determined that the tire identified with the tire ID information acquired by the reader is a counterfeit product, the controller acquires position information of the information presentation apparatus, specifies a dealer selling tires which are genuine products, near the information presentation apparatus, on a basis of the acquired position information, and causes the information presenter to further present information regarding the specified dealer.

2. The information presentation system according to claim 1, further comprising
   a second database configured to store user ID information for identifying the user and vehicle ID information for identifying a vehicle owned by the user in association with each other,
   wherein the information presentation apparatus further comprises
      a memory configured to store the user ID information of the user, and
      in a case where it is determined that the tire identified with the tire ID information acquired by the reader is a counterfeit product, the controller specifies vehicle ID information stored in the second database in association with the user ID information stored in the memory, specifies a tire size of a tire to be mounted on the vehicle identified with the specified vehicle ID information, and causes the information presenter to further present information indicating an inventory status of tires of the specified tire size at the specified dealer.

3. The information presentation system according to claim 1,
   wherein the information presentation apparatus further comprises a camera, and
   in a case where it is determined that the tire identified with the tire ID information acquired by the reader is a counterfeit product, the controller acquires a captured image of a tread pattern of the tire determined as the counterfeit product with the camera, specifies a tire which is a genuine product and which has a tread pattern same as or similar to the tread pattern indicated in the acquired captured image, and causes the information presenter to further present information indicating the specified tire.

4. The information presentation system according to claim 3,
   wherein the controller causes the information presenter to further present information indicating an inventory status of the specified tire which is a genuine product, at the specified dealer.

5. The information presentation system according to claim 1,
   wherein, in a case where it is determined that the tire identified with the tire ID information acquired by the reader is a counterfeit product, the controller makes a notification of the acquired position information to predetermined contact information.

6. The information presentation system according to claim 1,
wherein, in a case where it is determined that the tire identified with the tire ID information acquired by the reader is a counterfeit product, the controller specifies a dealer which sells the tire determined as the counterfeit product on a basis of the acquired position information, and makes a notification of information regarding the specified dealer which sells the tire determined as the counterfeit product, to predetermined contact information.

7. An information presentation apparatus which presents information indicating whether a tire to be provided to a user is a genuine product or a counterfeit product, to the user, the information presentation apparatus comprising:
an information presenter configured to present information to the user;
a reader configured to perform near field communication with a transmitter which is attached to the tire to be provided to the user and which transmits tire ID information for identifying the tire, to acquire the tire ID information transmitted by the transmitter; and
a controller configured to determine whether or not the tire ID information acquired by the reader is stored in a database which stores tire ID information of tires which are genuine products, and in a case where the acquired tire ID information is stored in the database, determine that tire identified with the acquired tire ID information is a genuine product, and cause the information presenter to present information indicating that the tire identified with the acquired tire ID information is a genuine product, and/or, in a case where the acquired tire ID information is not stored in the database, determine that the tire identified with the acquired tire ID information is a counterfeit product, and cause the information presenter to present information indicating that the tire identified with the acquired tire ID information is a counterfeit product,
wherein, in a case where it is determined that the tire identified with the tire ID information acquired by the reader is a counterfeit product, the controller acquires position information of the information presentation apparatus, specifies a dealer selling tires which are genuine products, near the information presentation apparatus, on a basis of the acquired position information, and causes the information presenter to further present information regarding the specified dealer.

8. An information presentation method, by an information presentation apparatus, for presenting information indicating whether a tire to be provided to a user is a genuine product or a counterfeit product, to the user, the information presentation method comprising:
performing near field communication with a transmitter which is attached to the tire to be provided to the user and which transmits tire ID information for identifying the tire, to acquire the tire ID information transmitted by the transmitter;
determining whether or not the acquired tire ID information is stored in a database which stores tire ID information of tires which are genuine products, and in a case where the acquired tire ID information is stored in the database, determining that tire identified with the acquired tire ID information is a genuine product, and presenting to the user, information indicating that the tire identified with the acquired tire ID information is a genuine product, and/or, in a case where the acquired tire ID information is not stored in the database, determining that the tire identified with the acquired tire ID information is a counterfeit product, and presenting to the user, information indicating that the tire identified with the acquired tire ID information is a counterfeit product; and
in a case where it is determined that the tire identified with the acquired tire ID information is a counterfeit product, acquiring position information of the information presentation apparatus, specifying a dealer selling tires which are genuine products, near the information presentation apparatus, on a basis of the acquired position information, and further presenting to the user, information regarding the specified dealer.

9. The information presentation system according to claim 5,
wherein, in a case where it is determined that the tire identified with the tire ID information acquired by the reader is a counterfeit product, the controller specifies a dealer which sells the tire determined as the counterfeit product on a basis of the acquired position information, and makes a notification of information regarding the specified dealer which sells the tire determined as the counterfeit product, to predetermined contact information.

10. The information presentation system according to claim 2,
wherein the information presentation apparatus further comprises a camera, and
in a case where it is determined that the tire identified with the tire ID information acquired by the reader is a counterfeit product, the controller acquires a captured image of a tread pattern of the tire determined as the counterfeit product with the camera, specifies a tire which is a genuine product and which has a tread pattern same as or similar to the tread pattern indicated in the acquired captured image, and causes the information presenter to further present information indicating the specified tire.

11. The information presentation system according to claim 2,
wherein, in a case where it is determined that the tire identified with the tire ID information acquired by the reader is a counterfeit product, the controller makes a notification of the acquired position information to predetermined contact information.

12. The information presentation system according to claim 2,
wherein, in a case where it is determined that the tire identified with the tire ID information acquired by the reader is a counterfeit product, the controller specifies a dealer which sells the tire determined as the counterfeit product on a basis of the acquired position information, and makes a notification of information regarding the specified dealer which sells the tire determined as the counterfeit product, to predetermined contact information.

13. The information presentation system according to claim 3,
wherein, in a case where it is determined that the tire identified with the tire ID information acquired by the reader is a counterfeit product, the controller makes a notification of the acquired position information to predetermined contact information.

14. The information presentation system according to claim 3, wherein, in a case where it is determined that the tire identified with the tire ID information acquired by the reader is a counterfeit product, the controller specifies a dealer which sells the tire determined as the counterfeit product on a basis of the acquired position information, and makes a notification of information regarding the specified dealer which sells the tire determined as the counterfeit product, to predetermined contact information.

15. The information presentation system according to claim 4,
    wherein, in a case where it is determined that the tire identified with the tire ID information acquired by the reader is a counterfeit product, the controller makes a notification of the acquired position information to predetermined contact information.

16. The information presentation system according to claim 4,
    wherein, in a case where it is determined that the tire identified with the tire ID information acquired by the reader is a counterfeit product, the controller specifies a dealer which sells the tire determined as the counterfeit product on a basis of the acquired position information, and makes a notification of information regarding the specified dealer which sells the tire determined as the counterfeit product, to predetermined contact information.

\* \* \* \* \*